United States Patent
Rao Gadiyar et al.

(10) Patent No.: US 10,489,804 B2
(45) Date of Patent: Nov. 26, 2019

(54) SYSTEM AND METHOD FOR IDENTIFYING CUSTOMER PERSONA AND IMPLEMENTING PERSUASION TECHNIQUES THEREOF

(71) Applicant: Cognizant Technology Solutions India Pvt. Ltd., Chennai, TN (US)

(72) Inventors: Anitha Rao Gadiyar, Chennai (IN); Hitesh Bagchi, Kolkata (IN); Naveen Kumar, Kolkata (IN); Rita Karmakar, Kolkata (IN)

(73) Assignee: COGNIZANT TECHNOLOGY SOLUTIONS INDIA PVT. LTD., Chennai (IN)

( * ) Notice: Subject to any disclaimer, the term of this patent is extended or adjusted under 35 U.S.C. 154(b) by 657 days.

(21) Appl. No.: 14/885,368

(22) Filed: Oct. 16, 2015

(65) Prior Publication Data
US 2017/0004519 A1 Jan. 5, 2017

(30) Foreign Application Priority Data
Jul. 3, 2015 (IN) .......................... 3422/CHE/2015

(51) Int. Cl.
*G06Q 30/02* (2012.01)
(52) U.S. Cl.
CPC ................................ *G06Q 30/0204* (2013.01)
(58) Field of Classification Search
CPC ..................................................... G06Q 30/02
See application file for complete search history.

(56) References Cited

U.S. PATENT DOCUMENTS

| | | | |
|---|---|---|---|
| 8,346,782 B2 | 1/2013 | Zhang | |
| 8,838,522 B1 | 9/2014 | Brundage | |
| 2002/0128944 A1* | 9/2002 | Crabtree | G06Q 40/04 705/37 |
| 2008/0091517 A1* | 4/2008 | Koonce | G06Q 30/02 705/14.42 |
| 2009/0182630 A1* | 7/2009 | Otto | G06Q 20/20 705/14.1 |
| 2011/0093415 A1 | 4/2011 | Rhee | |
| 2012/0084349 A1* | 4/2012 | Lee | G06Q 30/02 709/203 |
| 2012/0323682 A1* | 12/2012 | Shanbhag | G06Q 30/0601 705/14.51 |
| 2013/0238422 A1* | 9/2013 | Saldanha | G06Q 30/02 705/14.45 |

(Continued)

FOREIGN PATENT DOCUMENTS

WO 2014032614 A1 3/2014

*Primary Examiner* — Kurtis Gills
(74) *Attorney, Agent, or Firm* — Cantor Colburn LLP

(57) ABSTRACT

A computer-implemented method and a system for implementing persuasion techniques based on persona of one or more online users is provided. Session data of the online users is extracted from one or more e-commerce applications and is analyzed using a behavior mapping model to identify persona of the one or more users. The one or more users or shoppers are segmented into different categories based on the identified persona of the users. One or more persuasion techniques are generated corresponding to each category of the segmented users. The persona-centric persuasion techniques are implemented in the field of e-commerce to motivate online users to shop.

24 Claims, 8 Drawing Sheets

(56) References Cited

U.S. PATENT DOCUMENTS

| | | | | |
|---|---|---|---|---|
| 2014/0195316 A1* | 7/2014 | Vorotyntsev | ....... | G06Q 30/0214 705/14.16 |
| 2014/0257990 A1* | 9/2014 | Cudgma | ............ | G06Q 30/0269 705/14.66 |
| 2015/0161671 A1* | 6/2015 | Watkeys | ............ | G06Q 30/0269 705/14.66 |

* cited by examiner

Behavior Mapping Model 300

| Attributes | Decisive | Visitor | Learned | Explorer |
|---|---|---|---|---|
| Average duration per visit/session | 35-45 mins approx. | 10-15 mins approx | ≥2 hrs (time taken to view the reviews, ratings, product details, specification, size, designs, colors, etc) | 2 - 2.5 hrs (time taken to view different types of items rather than detailed reviews, ratings and specifications ) |
| Number of items in the final cart | Approx. 3-4 similar kind of products | Approx. 1-2 products | Approx. 8-10 items | 10-15 items (different kinds of items e.g. home décor, apparel, electronic gadgets, gift card etc.) |
| Average clicks per visit/session | Approx. 20 - 25 clicks | Approx. ≤ 15 clicks | Approx. ≥ 30 clicks | Approx. ≥ 45 clicks |
| Proceed to final checkout | (9:10) | (5:10) | (7:10) | (2:10) |
| Leave shopping site without buying | (1:10) | (5:10) | (3:10) | (8:10) |

FIG 3a

User Specific Persuasive Techniques

| Users | Persuasive Techniques |
|---|---|
| *Decisive* | <ul><li>Providing utilitarian values of the product</li><li>Providing convenience and ease in shopping experiences.</li><li>Providing very few top rated reviews on the product</li><li>Providing attractive offers</li><li>Offering for writing reviews</li></ul> |
| *Visitors* | <ul><li>Providing quick sessions that are shopper friendly, easy to navigate, has smart filtering and precise information</li><li>Providing Fun/excitement during shopping</li><li>Providing in-store experience to develop shoppers trust, mitigate uncertainties with clear refund policy, shipping information, money transaction policy etcetera.</li><li>Emphasizing on saving money by flashing heavy discounts and offers</li></ul> |
| *Learned* | <ul><li>Using social proof tactics and showing various top rated reviews on the product to the users, and comparative reviews with the help of chart, graph etcetera</li><li>Suggesting purchase backed up by some strong good reviews</li><li>Providing small and eye catchy but informative videos for the demonstrating the product</li><li>Offering for writing reviews and posting Q and A in FAQs</li><li>Providing standing and combo offers</li></ul> |
| *Explorer* | <ul><li>Providing hedonic and aesthetic aspects of the product</li><li>Providing clear expert advice/opinion on "suggested purchase"</li><li>Providing smart filtering to prevent users from getting lost and confused with large number of options)</li><li>Providing interactive, fun filled shopping environment with evocative visuals and music</li><li>Pronouncing upcoming items/ new arrivals</li><li>Providing scarcity tactics of persuasion (Momentary/ limited period offers e.g. offers limited for next 15 minutes)</li></ul> |

FIG 3b

SYSTEM AND METHOD FOR IDENTIFYING CUSTOMER PERSONA AND IMPLEMENTING PERSUASION TECHNIQUES THEREOF

CROSS REFERENCE TO RELATED APPLICATION

This application is related to and claims the benefit of Indian Patent Application Number 3422/CHE/2015 filed on Jul. 3, 2015, the contents of which are herein incorporated by reference in their entirety.

FIELD OF THE INVENTION

The present invention relates generally to the field of e-commerce and more particularly to identification of customer persona and implementation of persuasive marketing techniques.

BACKGROUND OF THE INVENTION

Electronic commerce (or e-commerce) has grown increasingly popular over the years. The Internet has not only made online shopping easier for e-shoppers/users, but has also helped various e-marketers and e-retailers to gain business by reaching a larger pool of people. However, with increase in competition amongst the e-retailers, it has become quite important to understand the need and intent of the e-shoppers. Identifying the need and behavior of the e-shoppers provides a better understanding of online shopper's personality and their shopping trend that in turn provides better shopper-centric recommendation and enables the e-retailers to gain profit.

Various approaches are known in the art for identifying and analyzing behavior of the online shoppers in order to provide product recommendations to the shoppers. These include the techniques based on browsing history and demographic data of the shoppers, and segmentation-techniques that generally identify behavior of online shoppers or users participating in the online shopping activities.

Some existing solutions exhibit content-based recommendations where a shopper is recommended buying items similar to the items purchased or preferred by her in the past. Other existing solutions exhibit collaborative filtering, where a shopper is recommended buying items similar to the items purchased or preferred by other people in the past in a similar fashion. The content-based recommendations and the collaborative filtering techniques help in analyzing shopping patterns of the shoppers to identify shoppers' personalities. However, the existing solutions fail to perform a complete analysis of shoppers' personalities and therefore only limited characteristics of the shoppers can be identified with respect to his/her shopping capabilities. The actual need and intent of the shoppers is not identified by the existing solutions known in the state of art.

In light of the above, there is a need for a system and method to identify the actual need and intent of online shoppers/users. Further, there is a need for a system and method to identify and monitor complex and dynamic behavior of online shoppers. Furthermore, there is a need for a system and method to identify and implement persona-centric persuasion techniques that can be implemented in the field of e-commerce to motivate online users to shop.

SUMMARY OF THE INVENTION

A computer-implemented method and a system for implementing persuasion techniques based on persona of one or more users is provided.

The computer-implemented method comprises the steps of: extracting session data from one or more e-commerce applications being accessed by the one or more users; providing a behavior mapping model having one or more categories of the one or more users, each category based on one or more attributes predefined by analyzing e-commerce trends; analyzing the session data using the behavior mapping model for identifying persona of each of the one or more users; segmenting the one or more users based on the identified persona to generate user segmentation data; generating and implementing one or more persuasion techniques corresponding to the user segmentation data; and validating accuracy of the implemented persuasion technique for each of the one or more users.

The system for implementing persuasion techniques comprises a processor, a data extractor, a behavior mapping model, a user segmentation module, and a persuasion module. The computer processor executes program instructions stored in a memory to configure the data extractor, the behavior mapping model, the user segmentation module, and the persuasion module. The data extractor is configured to extract session data from one or more e-commerce applications being accessed by the one or more users. The behavior mapping model comprises one or more categories of the one or more users, each category based on one or more attributes predefined by analyzing e-commerce trends. The user segmentation module is configured to: analyze the session data using the behavior mapping model for identifying persona of each of the one or more users; and segment the one or more users based on the identified persona to generate user segmentation data. The persuasion module is configured to generate and implement one or more persuasion techniques corresponding to the user segmentation data, wherein accuracy of the implemented persuasion technique is validated for each user of the one or more users.

In various embodiments of the present invention, the session data pertains to one or more online activities performed on the one or more e-commerce applications by the one or more users. further, the one or more categories of the one or more users include but are not limited to Decisive, Visitor, Learned and Explorer. Furthermore, the one or more attributes include but are not limited to average duration per session, number of items in the cart, average number of clicks per session, count of users proceeding to final checkout, and count of users leaving the e-commerce application without buying.

In various embodiments of the present invention, a Buy/Quit Ratio (BQR) is calculated that measures instances of buying an item versus instances of quitting without buying any item by a segmented user in 'k' sessions, wherein 'k' is a positive integer. The BQRs of each instance of the 'k' sessions are compared to check whether the BQRs for the segmented user are continuously high, or continuously low, or remain unchanged as a trend throughout the 'k' sessions. If the BQRs for the segmented user are continuously high, then the BM model is updated or fine tuned. However, if the BQRs for the segmented user are continuously low or remain unchanged, then the user is re-segmented.

In various embodiments of the present invention, the process of validation is repeated until the persuasion technique for corresponding segmented user is accurately identified.

A computer program product for implementing persuasion techniques based on persona of one or more users is provided. The computer program product comprises a non-transitory computer readable medium having computer readable program code comprising program instructions that when executed by a processor, cause the processor to: extract session data from one or more e-commerce applications being accessed by the one or more users; provide a behavior mapping model having one or more categories of the one or more users, each category based on one or more attributes predefined by analyzing e-commerce trends; analyze the session data using the behavior mapping model for identifying persona of each of the one or more users; segment the one or more users based on the identified persona to generate user segmentation data; generate and implement one or more persuasion techniques corresponding to the user segmentation data; and validate accuracy of the implemented persuasion technique for each user of the one or more users.

The program instructions further cause the processor to calculate a Buy/Quit Ratio (BQR) that measures instances of buying an item versus instances of quitting without buying any item by a segmented user in 'k' sessions, wherein 'k' is a positive integer; compare the BQRs of each instance of the 'k' sessions to check whether the BQRs for the segmented user are continuously high, or continuously low, or remain unchanged as a trend throughout the 'k' sessions; update the BM model if the BQRs for the segmented user are continuously high; and re-segmented the user if the BQRs for the segmented user are continuously low or remain unchanged.

BRIEF DESCRIPTION OF THE ACCOMPANYING DRAWINGS

The present invention is described by way of embodiments illustrated in the accompanying drawings wherein:

FIGS. 3a and 3b are tables illustrating behavior mapping model and persuasion techniques respectively in accordance with an exemplary embodiment of the present invention;

DETAILED DESCRIPTION OF THE INVENTION

A system and a method for identifying and implementing one or more persuasion techniques in e-commerce are described herein. The invention provides for a system and method that identify the actual need and intent of online shoppers for implementing persuasion techniques in e-commerce industry. The invention further provides for a system and method that identify and monitor complex and dynamic behavior of online shoppers. Furthermore, the invention provides for a system and method that identify persona-centric persuasion techniques to be implemented in the field of e-commerce to motivate online users to shop.

The following disclosure is provided in order to enable a person having ordinary skill in the art to practice the invention. Exemplary embodiments are provided only for illustrative purposes and various modifications will be readily apparent to persons skilled in the art. The general principles defined herein may be applied to other embodiments and applications without departing from the spirit and scope of the invention. Also, the terminology and phraseology used is for the purpose of describing exemplary embodiments and should not be considered limiting. Thus, the present invention is to be accorded the widest scope encompassing numerous alternatives, modifications and equivalents consistent with the principles and features disclosed. For purpose of clarity, details relating to technical material that is known in the technical fields related to the invention have not been described in detail so as not to unnecessarily obscure the present invention.

The present invention would now be discussed in context of embodiments as illustrated in the accompanying drawings.

Figure 1:
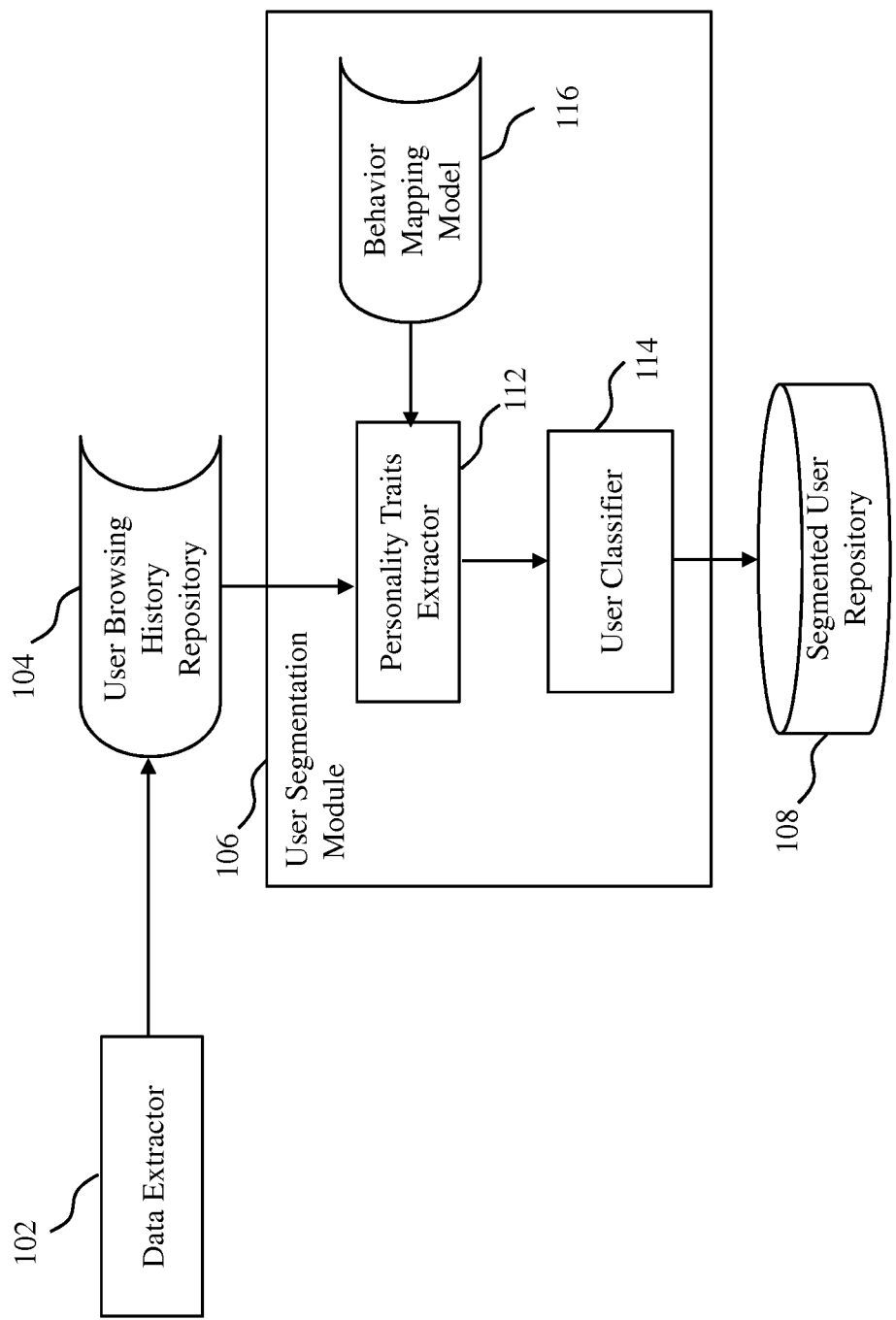
FIG. 1 is a block diagram of a system providing user segmentation for identifying customer persona in accordance with an embodiment of the present invention.

FIG. 1 is a block diagram of a system providing user segmentation for identifying customer persona in accordance with an embodiment of the present invention. The system comprises a data extractor 102, a user browsing history repository 104, a user segmentation module 106, and a segmented user repository 108.

The data extractor 102 extracts user browsing history data of one or more users who access one or more e-commerce applications. In one embodiment of the present invention, the one or more users are the online shoppers and customers and the e-commerce applications are the e-commerce websites such as 'Amazon', 'eBay', 'Flipkart' etcetera. The one or more users access the e-commerce applications to either purchase any items/services of their choice or to browse and check out the details of the items/services. The user browsing history data is extracted separately for each user and is stored in the user browsing history repository 104. This facilitates in keeping track of every single session of online shopping/browsing performed by each individual user of the one or more users.

The user browsing history data is extracted or gathered by recording various activities performed by the user on the e-commerce applications. The various activities of the users are recorded for one or more sessions wherein each session starts from the entry of the users and ends at their exit from the e-commerce applications. The activities of a user during one session are recorded as the session data of the corresponding user. The session data is identified and recorded separately for each user. Different sessions of the user conducted in different time is also tracked and recorded to analyze the trend of the user activities. The session data comprises data pertaining to one or more user activities including but not limited to browsing the types and categories of one or more products, items, services, and offers; adding or removing one or more products to/from the online shopping cart; purchasing the items; recommending the items to friends, family or other contacts of the user; writing a review or checking out reviews of other users/customers etcetera. The session data is extracted and recorded using one of the two processes. The first process of data gathering uses an event streaming tracking approach whereas the other process uses an interceptor approach. In one embodiment of the present invention, the session data is gathered using the event stream tracking approach, wherein a script has to be deployed on the application front, which keeps track of the data whenever an event pertaining to online shopping occurs. The script is a program deployed which keeps track of the events performed by the user and thus extracts the activities performed by the individual user. Thus, the data is gathered for each and every event of the event stream. For example, an event of 'browsing a product' will have data pertaining to product type, product cost, time and duration of browsing the product and product reviews, etcetera that will be gathered using the event stream tracking approach. The gathered data is then stored for user segmentation purposes.

In another embodiment of the present invention, the data may be gathered using an interceptor approach wherein an interceptor module is used to intercept a request and its response on the e-commerce application. For example, when a user intending to buy a pen drive goes to the pen drive page of the shopping site, the browser on behalf of the user requests the e-commerce application for the concerned page and accordingly the e-commerce application sends response to the browser. The interceptor module extracts data for each and every activity performed by the shopper.

The user segmentation module 106, receives session data from the user browsing history repository 104 and performs segmentation of the users based upon the session data. The user segmentation module 106 performs user segmentation and generates segmentation details of each user. The generated segmentation details or user segmentation data is stored in the segmented user repository 108. The user segmentation data is further used in the process of generating and implementing the persuasive marketing techniques. The user segmentation module 106 comprises a personality traits extractor 112, a behavior mapping model (BM model) 114 and a user classifier 116 that help in providing segmentation of the one or more users as discussed below.

The personality traits extractor 112 receives session data from the user browsing history repository 104 and analyzes the session data. The personality traits extractor 112 analyzes the session data using the BM model 114 to identify personality traits of the one or more users. In an embodiment of the present invention, the BM model is a reference table containing predefined categories and attributes of the one or more users. Various personality traits and behaviors of the user as per the e-commerce trends are contemplated and are used as the attributes to create the BM model. The BM model is created and stored in the user segmentation module 106 and is referred by the personality traits extractor 112 to identify the personality traits of the users. The personality traits are thus identified by the analysis of the session data using BM model 116. Details of BM model are discussed in the description of FIG. 3a. According to the embodiments of the present invention, the identified personality traits are used to classify the one or more users into various segments. The personality traits identified by the personality traits extractor 112 are used as attributes by the user classifier 114 to generate segmentation data. The user classifier 114 facilitates in classifying the one or more users into one or more categories using the attributes identified by the personality traits extractor 112. The various attributes include but are not limited to average duration of a session, number of items finalized in a cart by the user, average number of clicks per session, number of users proceeding to final checkout, number of users leaving the e-commerce application without buying any item etcetera. The users can be classified into one or more categories including but not limiting to decisive, explorer, learned and visitor etcetera. The classified categories or the segmentation data of the one or more users are finally stored in the segmented user repository 108.

Figure 2:
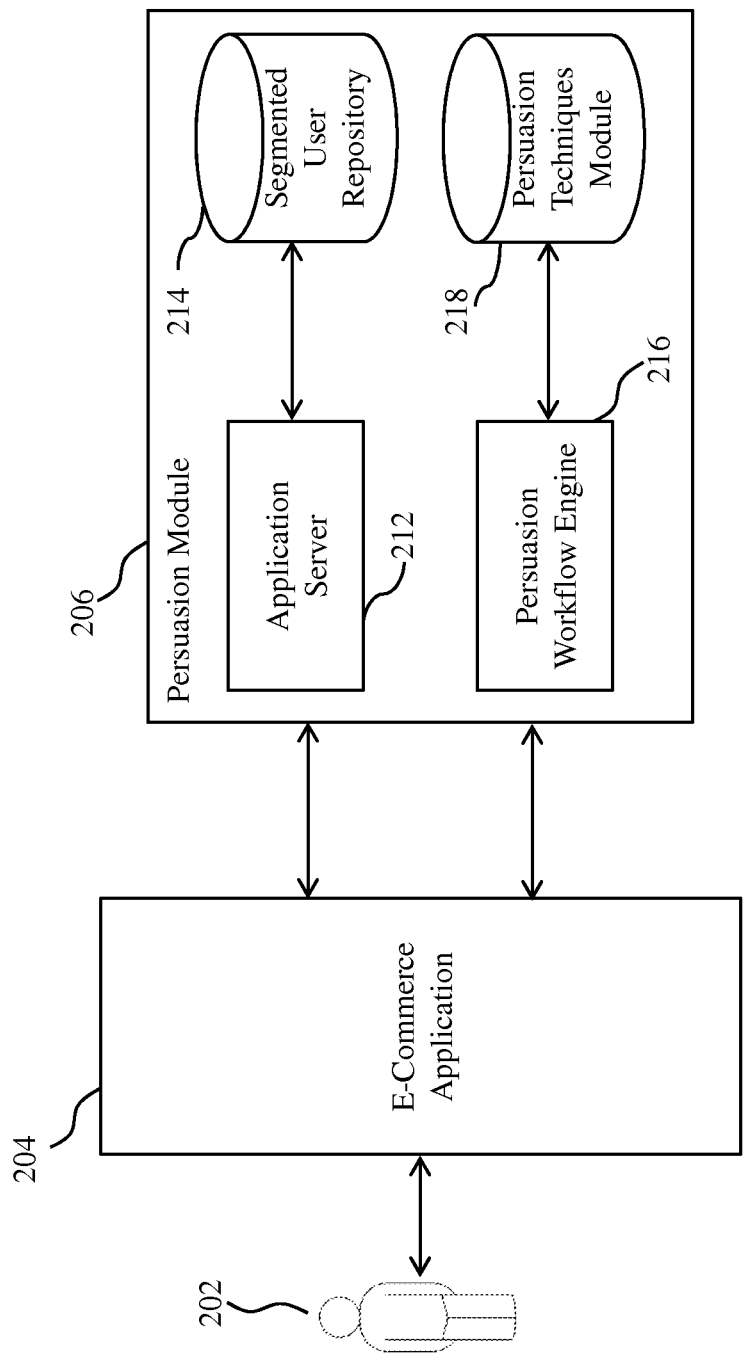
FIG. 2 is a block diagram illustrating persuasion techniques implementation in e-commerce applications in accordance with an embodiment of the present invention.

FIG. 2 is a block diagram illustrating implementation of persuasion techniques in e-commerce applications according to an embodiment of the present invention. The implementation of the persuasion techniques facilitates e-retailers to provide suitable product recommendations to their customers and thereby increase their sale and retain their customers. A persuasion module 206 is provided to implement the persuasion techniques in e-commerce applications 204 based on the segmentation of the one or more users 202. The persuasion module 206 comprises an application program interface server (API server) 212, the segmented user repository 214, a persuasion workflow engine 216 and a persuasion techniques module 218.

The application program interface server (API server 212) is a server, web server, or a system that provides necessary hardware and software platform to the persuasion module 206. The API server 212 is configured to authorize one or more e-retailers and e-marketers (hereinafter e-sellers) to access the persuasion module 206 and implement the persuasion techniques in the e-commerce application. The API server 212 is further configured to interact with the e-commerce application 204 and the segmented user repository 214 as a query engine to provide user segmentation data to the authorized e-sellers.

The user segmentation data stored in the segmented user repository 214 is used by the persuasion workflow engine 216 to identify persuasion techniques that can be implemented in the e-commerce applications and can be applied to individual users by the e-sellers to retain the users 202. The persuasion workflow engine 216 is a controller that identifies persona centric persuasion techniques with respect to different categories of the segmented data for each individual user. The persuasion techniques are related to different persona centric categories of segmented data and are generated by the persuasion technique module 218. The persuasion techniques are generated using the literature of behavior analysis and e-commerce. These are generated and stored in the persuasion technique module 218. The persuasion workflow engine 216 interacts with the e-commerce application 204 and provides it with the persuasions techniques stored in the persuasion technique module 218. The persuasion technique module 218 is also updated periodically by the persuasion workflow engine 216 to include the state-of-the-art techniques in the module 218. Thus based on the latest user shopping trends and behavior of the users 202, the module is updated and stored with different and latest persuasion techniques with respect to segments of the users 202. The API server 212 acts as a medium of interaction with the e-commerce application. When the user accesses the e-commerce application, it interacts with the API server which provides the user segment information and different persuasion techniques to be applied to the individual user. Thus the different persuasion techniques are the personacentric persuasion techniques that are implemented in the field of e-commerce to motivate online users to shop.

FIGS. 3a and 3b represent table illustrating behavior mapping model and persuasion techniques respectively in accordance with an exemplary embodiment of the present invention.

FIG. 3a shows the behavior mapping model 300 that is used to segment users into different personas based on their detailed web browsing history or session data. As mentioned earlier, the BM model 300 is a reference table containing predefined categories and attributes of the one or more users. In one embodiment of the present invention, the behavior mapping model is created by pre-defining the one or more attributes and categorizing personas of the users based on the predefined attributes. The attributes are predefined after analysis of various personality traits and behaviors of the one or more users revealed as per the e-commerce trends. The BM model 300 may be updated from time to time to modify the attributes by adding new attributes or by removing and replacing the existing ones. The BM model 300 may also be updated to make addition in the existing predefined categories of user personas.

In various embodiments of the present invention, the attributes include but are not limited to average duration of a session, number of items finalized in a cart by the user, average number of clicks per session, number of users proceeding to final checkout, number of users leaving the e-commerce application without buying any item etcetera. Based on these persona-based attributes, the categories of personas of users are pre-defined in the BM model 300. Further, based on the categories of personas of the users, different persuasion techniques are applied to motivate the users to buy a product.

In various embodiments of the present invention and as shown in FIG. 3a, four categories of personas are predefined that include 'Decisive', 'Explorer', 'Learned', and 'Visitors'. Each of the four categories is discussed in detail below.

Decisive:

The Decisive users are those users who are determined about their choice. They decide firmly what they want to buy and according to their decisions they try to get that item at the best price and at reasonable shipping time. The users falling under this category are thus focused and perform their task of shopping with an assertive mind set.

Explorer:

The Explorers are those users who are not so determined about their choice but are ready to explore. They have a very general idea about their needs and may be overwhelmed by too many choices and multiple recommendations. These users are inclined to the decisions and preferences of other users and often apply the recommendations of other users to buy an item. The users falling under this category thus have hedonic mind set and are high on openness to experience.

Learned:

The Learned are those users who are not keen in buying unless all the options and recommendations are explored by them. These users first learn and gain thorough knowledge of the items and then proceed to buying or not buying. These users thus have a very exploratory mind set and want to explore different alternative which is more cognitively based.

Visitors:

The Visitors very rarely perform online shopping. They purchase the items only when they have to buy something. These users do not explore on a regular basis as they are low on internet self-efficacy and are non-creative in terms of internet shopping.

Each of the above explained categories of user personas exhibits different attributes and characteristics and therefore different attributes have been predefined in the BM model 300. For example and as shown in the BM model 300, Decisive users may exhibit 35-45 minutes of average duration per session (from initial search till sign-off from the site). Whereas the Visitor may exhibit approximately 10-15 minutes, Learned may have less than 2 hours of average duration and the Explorer may have more than 2 hours of average duration per visit. Similarly for the attribute 'number of items in the final cart' the 3 to 4 items may be defined for Decisive users, 1 to 2 items for the visitors, 8 to 10 items for the Learned and 10 to 15 for the Explorers. The above description of BM model 300 is exemplary and may be updated or modified depending upon the latest e-commerce trends. The latest e-commerce trends can be identified by the process of validation as explained in FIG. 5 and accordingly the BM model can be fine tuned.

FIG. 3b represents the persuasion techniques applied to the users based upon the four categories of personas of the users viz. 'Decisive', 'Explorer', 'Learned', and 'Visitors'. The list of persona specific persuasive techniques is generated from the literature of e-commerce and behavior analysis. The list is exemplary and not exhaustive and may include other techniques according to the state-of-the-art and trends. The persuasive techniques are applied to motivate each and every shopper to buy the products and items. For example, the decisive users may be motivated by applying a persuasion technique that includes providing utilitarian values of the product and by providing logical reasons to the user to buy the product. Similarly, a learned user may be provided with good reviews of other users on the product to convince him/her to buy the product.

Figure 4:
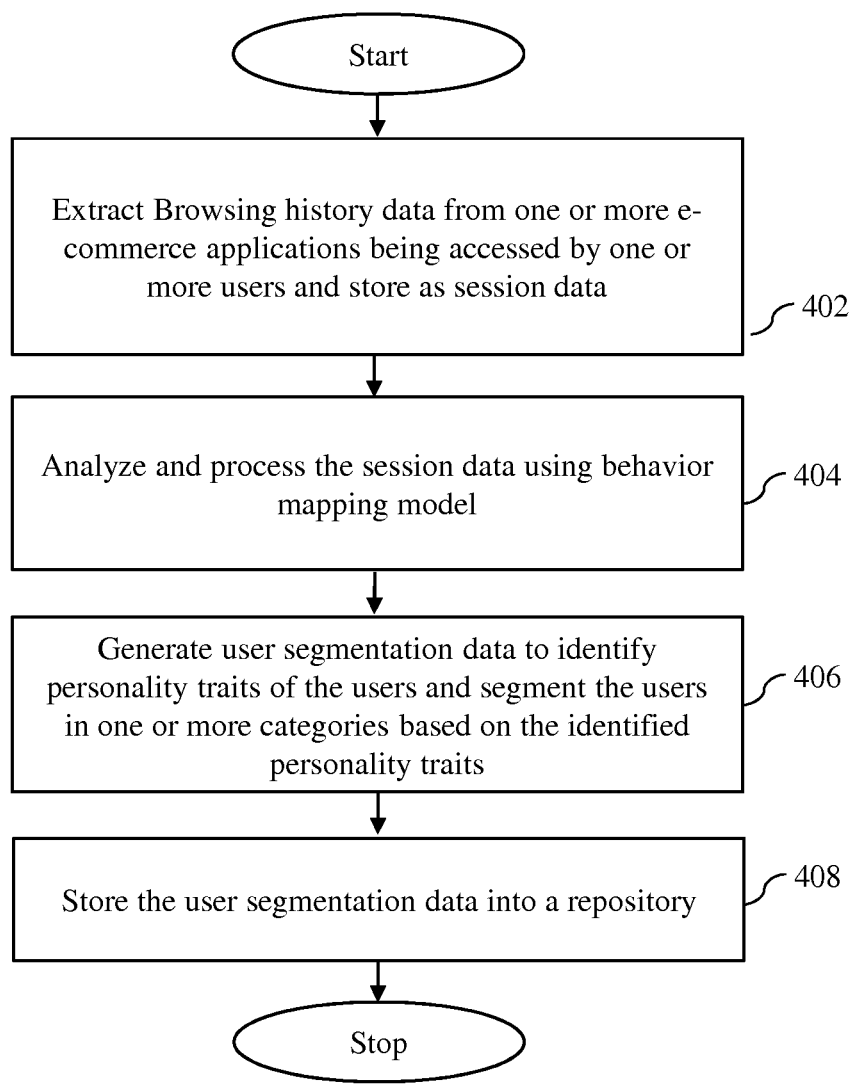
FIG. 4 is a flowchart illustrating method for segmenting one or more users in accordance with an exemplary embodiment of the present invention.

FIG. 4 is a flowchart illustrating method for segmenting the one or more users in accordance with an exemplary embodiment of the present invention. At step 402, browsing history data of one or more users is extracted. The one or more users access one or more e-commerce websites or e-commerce applications, and the user browsing history data is extracted or gathered by recording various activities performed by the users on the e-commerce applications. The one or more users access the e-commerce applications to either purchase any items/services of their choice or to browse and check out the details of the items/services. In one embodiment of the present invention, the one or more users are the online shoppers and customers and the e-commerce applications are the e-commerce websites such as 'Amazon', 'eBay', 'Flipkart' etcetera. The various activities of a user during one session are extracted and recorded as the session data of the user. The session data is extracted separately for each user and is used in the process of user segmentation. The session data comprises data pertaining to one or more user activities including but not limited to browsing the types and categories of one or more products, items, services, and offers; adding or removing one or more products to/from the online shopping cart; purchasing the items; recommending the items to friends, family or other contacts of the user; writing a review or checking out reviews of other users/customers etcetera.

At step 404 the session data is analyzed and processed using the behavior mapping model (BM model). In an embodiment of the present invention, the session data is analyzed using the BM model to identify personality traits of the one or more users. In various embodiments of the present invention, the BM model is a reference table containing predefined categories and attributes of the one or more users. The attributes are predefined by contemplating various personality traits and behaviors of the users revealed as per the e-commerce trends and the categories of the users are defined based on the attributes. Based on the extracted data and the BM model, the personality traits of the users are identified.

At step 406 the identified personality traits of the one or more users are used to generate user segmentation data that provides information on one or more categories of the personas of users. In an embodiment of the present invention, the identified personality traits of the users are used to generate user segmentation data. The users can be classified into one or more categories including but not limiting to decisive, explorer, learned and visitor etcetera. At step 406 the classified categories or the segmentation data of the one or more users are stored and is used to generate and implement the persuasion techniques.

The persuasion techniques are identified based on the stored segmentation data of users and accordingly different persuasion techniques are applied to different segments of the users. To verify whether the persuasion technique applied to a user is appropriate and accurate for that user or not, a validation process is executed along with the process of implementing persuasion techniques.

Figure 5A:
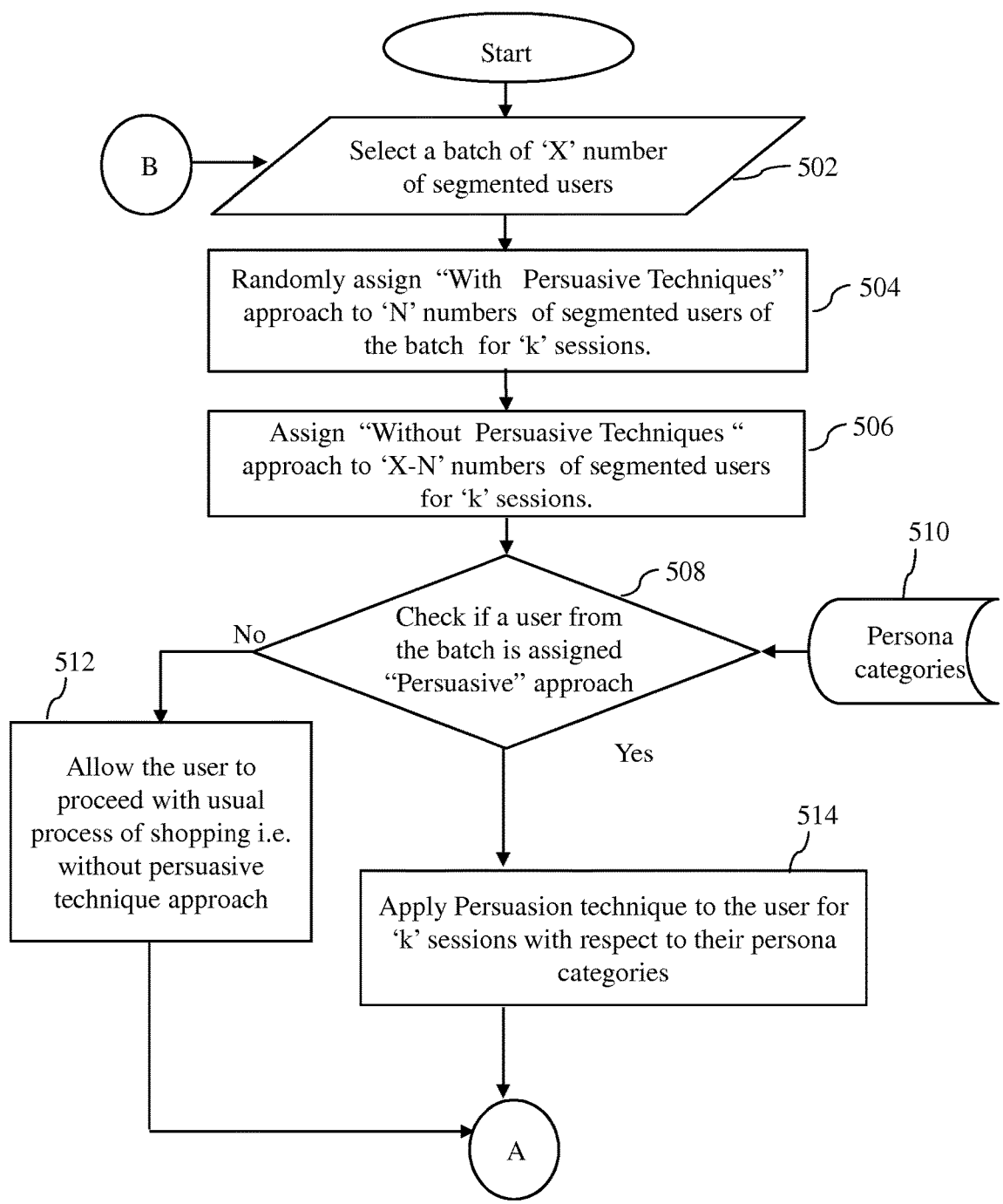
FIGS. 5a and 5b show a flowchart illustrating implementation of persuasion techniques and validation thereof in accordance with an exemplary embodiment of the present invention.
Figure 5B:
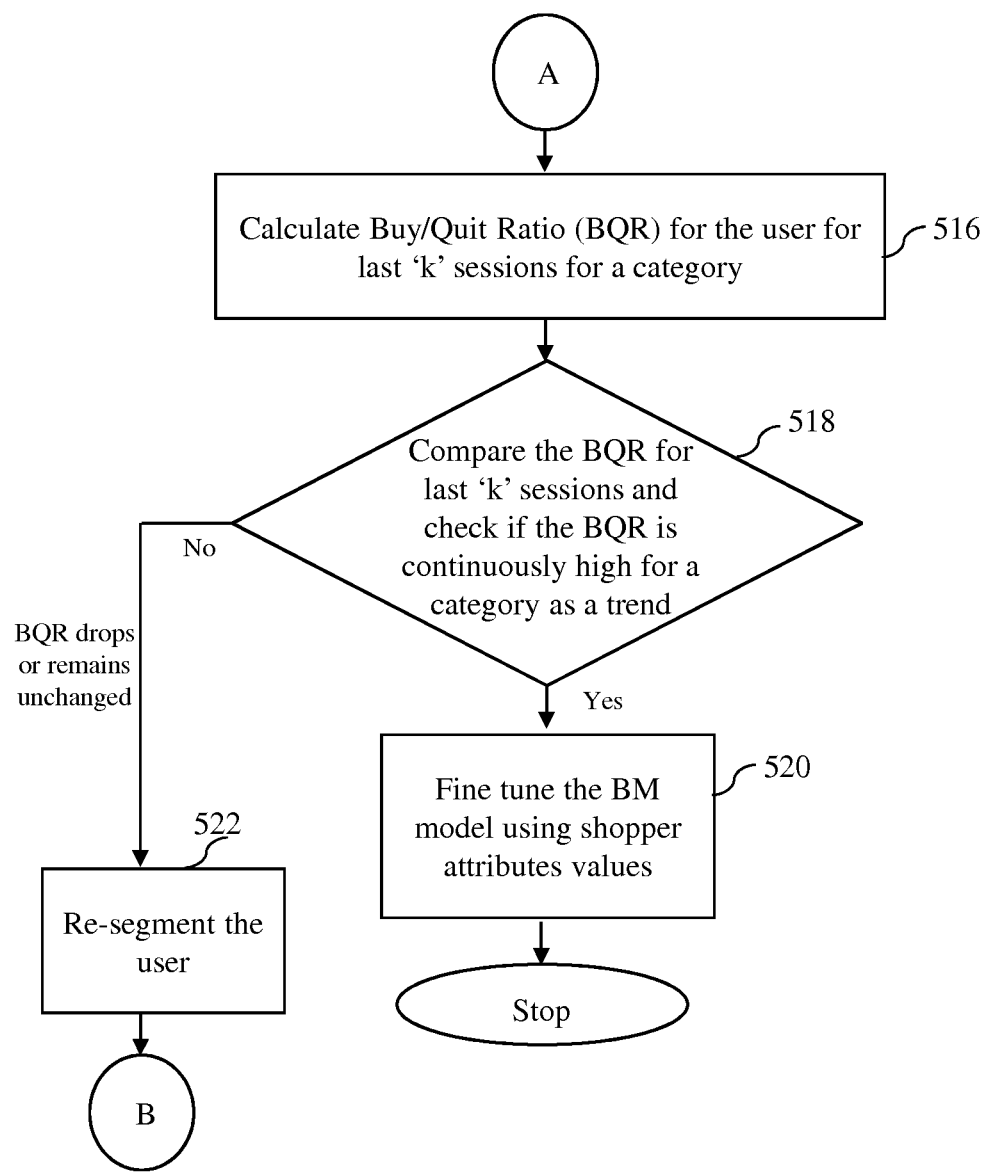

FIGS. 5a and 5b show a flowchart illustrating implementation of persuasion techniques and validation process of the implementation in accordance with an exemplary embodiment of the present invention. At step 502, a batch of 'X' number of segmented users is selected for implementation of the persuasion techniques. The segmented users are selected from the segmented user repository. At step 504, 'N' numbers of segmented users of the batch are assigned a first approach for 'k' numbers of sessions for a category. Wherein, the first approach is "applying persuasion techniques" approach and 'k' is a positive integer chosen randomly for implementing the persuasion techniques for a category. In the "applying persuasion techniques" approach, the persuasion techniques are applied to the segmented users.

At step 506, remaining users of the batch i.e. 'X-N' number of segmented users are assigned a second approach for 'k' sessions for a category. Wherein the second approach is a "without applying persuasion techniques" approach. In the "without applying persuasion techniques" approach, the persuasion techniques are not applied to the segmented users.

Each user of the batch is assigned to same approach for the entire session. For example if "User A" is selected for "applying persuasion techniques" approach, then until the entire 'k' number of sessions are completed, the approach for "User A" will not be changed. "User A" will be receiving persuasion techniques for the entire 'k' sessions during the validation process.

At step 508, the user is checked for the assigned approach. If the assigned approach is "without applying persuasion techniques" then the user is allowed to proceed with usual process of shopping at step 512 and no persuasion technique is applied thereon. At step 510, persona categories are applied. The persona specific categories or the segmented data of the one or more users are selected from the segmented user repository.

If the assigned approach is "applying persuasion techniques" approach then at step 514 persuasion technique is applied to the user for 'k' sessions with respect to his/her persona categories. At step 516 Buy/Quit Ratio (BQR) is calculated for each shopper. The BQR is the ratio to monitor the sales aspect of an individual user/shopper. The BQR measures the instances of users buying an item versus users leaving the e-commerce application without buying any item and is calculated with reference to 'n' number of sessions. Thus BQR is the ratio of number of buys in 'n' number of sessions to the number of quits in the 'n' number of sessions. For example: in ten sessions if a user buys three times and quits seven times, then his BQR will be calculated as ³⁄₇.

At step 518, the BQR for the first and second approach is compared and analyzed for the last 'k' sessions to determine the shopping trend of the user. If the BQR is found to be continuously high as a trend, then at step 520, the BM model is fine tuned by using attributes values. If the BQR continuously drops or remains unchanged then it depicts that the true persona of the user is not determined and hence the user is re-segmented at step 522. For example, if the BQR for the users who have been assigned the path of first approach "applying persuasion techniques" is higher over the entire 'k' sessions then it can be concluded that the applied persuasion techniques are effective. The data of those users can be used to further fine-tune the BM model. However, if the BQR for the users who have been assigned to the "applying persuasion techniques" path is lower over the entire 'k' sessions then it can be concluded that the applied persuasion techniques are not effective and the users are required to be re-segmented.

Thus If BQR of the second approach is less than the first approach, it indicates that the segmentation of the user in a given category is correct and true in nature, and therefore for such cases, the attributes of the users can be used to further tune the BM model. This process is therefore a dynamic iterative process that keeps on re-segmenting the users until the true persona of the user is identified. It also continuously fine tunes the BM model as it continuously gets updated at each instance of BQR of the second approach having a higher value.

However, if BQR of the second approach is greater than or almost similar to the first approach, then it can be concluded that the segmentation of the user is incorrect and re-segmentation of the user in another category is required.

In one embodiment of the present invention, the process of re-segmentation of the shoppers and fine tuning the BM model are batch processes, wherein each batch is executed after a fixed predefined interval of time. The validation process continuously validates the efficacy of the BM model so that true persona of each user may be identified and accordingly persuasion technique can be applied. Further, the attributes of the BM model is also continuously improved when the BM model is fine tuned.

Figure 6:
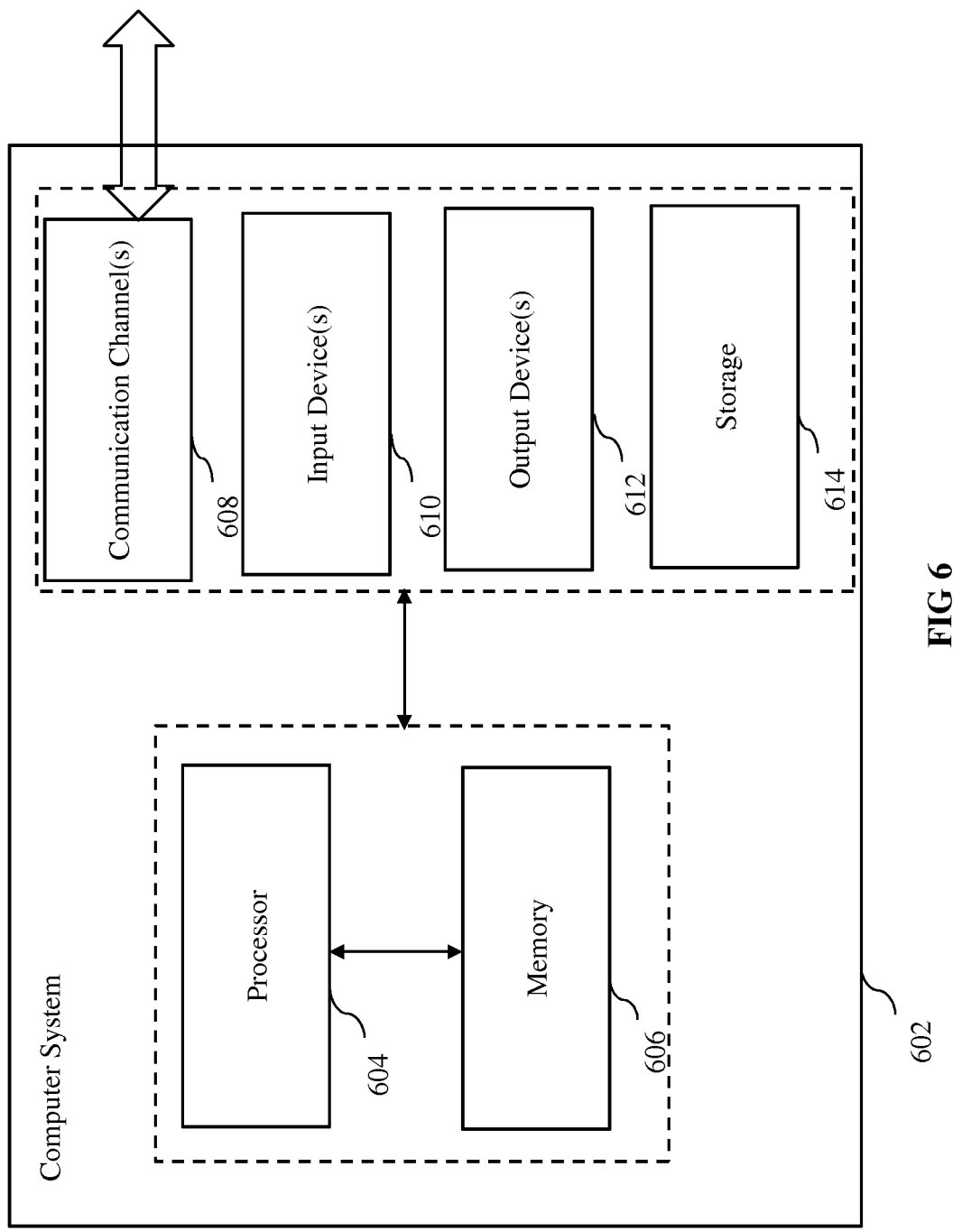
FIG. 6 illustrates an exemplary computer system in which various embodiments of the present invention may be implemented.

FIG. 6 illustrates an exemplary computer system in which various embodiments of the present invention may be implemented.

The computer system 602 comprises a processor 604 and a memory 606. The processor 604 executes program instructions and may be a real processor and/or a virtual processor. The computer system 602 is not intended to suggest any limitation as to scope of use or functionality of described embodiments. For example, the computer system 602 may include, but is not limited to, a general-purpose computer, a programmed microprocessor, a micro-controller, a peripheral integrated circuit element, and other devices or arrangements of devices that are capable of implementing the steps that constitute the method of the present invention. In an embodiment of the present invention, the memory 606 may store software for implementing various embodiments of the present invention. The computer system 602 may have additional components including one or more communication channels 608, one or more input devices 610, one or more output devices 612, and storage 614. An interconnection mechanism (not shown) such as a bus, controller, or network, interconnects the components of the computer system 602. In various embodiments of the present invention, operating system software provides an operating environment for various processes being executed in the computer system 602, and manages different functionalities of the components of the computer system 602.

The communication channel(s) 608 allow communication over a communication medium to various other computing entities. The communication medium provides information such as program instructions, or other data in a communication media. The communication media includes, but is not limited to, wired or wireless methodologies implemented with an electrical, optical, RF, infrared, acoustic, microwave, Bluetooth or other transmission media.

The input device(s) 610 may include, but not limited to, a keyboard, mouse, pen, joystick, trackball, a voice device, a scanning device, or any another device that is capable of providing input to the computer system 602. In an embodiment of the present invention, the input device(s) 610 may be a sound card or similar device that accepts audio input in analog or digital form. The output device(s) 612 may include, but not limited to, a user interface on CRT or LCD, printer, speaker, CD/DVD writer, or any other device that provides output from the computer system 602.

The storage 614 may include, but is not limited to, magnetic disks, magnetic tapes, CD-ROMs, CD-RWs, DVDs, flash drives or any other medium which can be used to store information and can be accessed by the computer system 602. In various embodiments of the present invention, the storage 614 contains program instructions for implementing the described embodiments.

The present invention may suitably be embodied as a computer program product for use with the computer system 602. The method described herein is typically implemented as a computer program product, comprising a set of program instructions which is executed by the computer system 602 or any other similar device. The set of program instructions may be a series of computer readable codes stored on a tangible medium, such as a computer readable storage medium (storage 614), for example, diskette, CD-ROM, ROM, flash drives or hard disk, or transmittable to the computer system 602, via a modem or other interface device, over either a tangible medium, including but is not limited to optical or analogue communications channel(s) 608. The implementation of the invention as a computer program product may be in an intangible form using wireless techniques, including but not limited to microwave, infrared, Bluetooth or other transmission techniques. These instructions can be preloaded into a system or recorded on a storage medium such as a CD-ROM, or made available for downloading over a network such as the internet or a mobile telephone network. The series of computer readable instructions may embody all or part of the functionality previously described herein.

The present invention may be implemented in numerous ways including as an apparatus, method, or a computer program product such as a computer readable storage medium or a computer network wherein programming instructions are communicated from a remote location.

While the exemplary embodiments of the present invention are described and illustrated herein, it will be appreciated that they are merely illustrative. It will be understood by those skilled in the art that various modifications in form and detail may be made therein without departing from or offending the spirit and scope of the invention as defined by the appended claims.

We claim:

1. A computer-implemented method for implementing persuasion techniques based on personality traits of multiple users, the method comprising:
executing via a programmed microprocessor, program instructions stored in a memory for:
extracting session data, for each event that corresponds to a predefined online activity, separately for each of the multiple users, wherein the session data is extracted based on, at least in part, intercepting a request and a corresponding response from an application associated with the predefined online activity;
analyzing the session data using a behavior mapping model for identifying personality traits of each of the multiple users associated with the predefined online activity, wherein the behavior mapping model includes pre-defined categories of the multiple users, each category is based on one or more attributes that are predefined by analyzing the personality traits associated with the multiple users;
segmenting the multiple users based on the identified personality traits to generate user segmentation data, wherein the segmentation is performed, at least, through an iterative process of re-segmenting the multiple users into the pre-defined categories until true persona of the users is identified, and further updating the one or more attributes of the behaviour mapping model based on the re-segmentation;
generating and implementing one or more persuasion techniques corresponding to the user segmentation data comprising computing a Buy/Quit (BQR) ratio for the segmented users for 'k' number of sessions based on a first technique and a second technique applied to a batch of the segmented users of a first predefined category, wherein in an event the Buy/Quit (BQR) ratio of the second technique is found to be greater than the first technique, the users with the applied second technique are re-segmented to a second predefined category; and
validating accuracy of the implemented persuasion technique for each of the multiple users.

2. The computer-implemented method of claim 1, wherein the one or more categories of the multiple users include decisive, visitor, learned and explorer.

3. The computer-implemented method of claim 1, wherein the one or more attributes include average duration per session, number of items in the cart, average number of clicks per session, count of users proceeding to final checkout, and count of users leaving the e-commerce application without buying.

4. The computer-implemented method of claim 1, wherein the first technique is applied to a predetermined number of segmented users selected from the batch of segmented users for the 'k' number of sessions of the first predefined category and the second technique is applied to the remaining number of segmented users from the batch for the 'k' number of sessions of the first predefined category, wherein the Buy/Quit Ratio (BQR) is a measure of instances of buying an item versus instances of quitting without buying any item by the segmented users in the 'k' sessions, wherein 'k' is a positive integer.

5. The computer-implemented method of claim 4, further comprising the step of comparing the BQRs of each instance of the 'k' sessions of the predetermined number of segmented users applied with the first technique and the remaining number of segmented users applied with the second technique to check whether the BQRs for the segmented user are continuously high, or continuously low, or remain unchanged as a trend throughout the 'k' sessions.

6. The computer-implemented method of claim 5, further comprising the step of updating the BM model if the BQRs for the segmented users are continuously high.

7. The computer-implemented method of claim 5, wherein the step of segmentation comprises the step of re-segmenting the users if the BQRs for the segmented user are continuously low or remain unchanged.

8. The computer-implemented method of claim 1, wherein the step of validation is repeated until the persuasion technique for corresponding segmented users is accurately identified.

9. A system for implementing persuasion techniques based on persona of multiple users comprising:
a programmed microprocessor for executing program instructions stored in a memory to configure:

a data extractor configured to extract session data, for each event that corresponds to a predefined online activity, separately for each of the multiple users, wherein the session data is extracted based on at least in part intercepting a request and a corresponding response from an application associated with the predefined online activity;

a behavior mapping model having one or more predefined categories of the multiple users, each category based on one or more attributes predefined by analyzing e-commerce trends;

a user segmentation module configured to analyze the session data using the behavior mapping model for identifying personality traits of each of the multiple users associated with the predefined online activity, and segment the multiple users based on the identified personality traits to generate user segmentation data, wherein the segmentation is performed at least through an iterative process of re-segmenting the multiple users into the pre-defined categories until the true persona of the user is identified, and further updating the one or more attributes of the behaviour mapping model based on the resegmentation, and a persuasion module configured to:

generate and implement one or more persuasion techniques corresponding to the user segmentation data comprising computing a Buy/Quit (BQR) ratio for the segmented users for 'k' number of sessions based on a first technique and a second technique applied to a batch of the segmented users of a first predefined category, wherein if the Buy/Quit (BQR) ratio of the second technique is found to be greater than the first technique, the users with the applied second technique are re-segmented to a second predefined category, and validating accuracy of the implemented persuasion techniques for each of the multiple users.

10. The system of claim 9, wherein the one or more categories of the multiple users include decisive, visitor, learned and explorer.

11. The system of claim 9, wherein the one or more attributes include average duration per session, number of items in the cart, average number of clicks per session, count of users proceeding to final checkout, and count of users leaving the e-commerce application without buying.

12. The system of claim 9, wherein the processor is configured to apply a first technique to a predetermined number of segmented users selected from the batch of segmented users for the 'k' number of sessions of the first predefined category and the second technique is applied to the remaining number of segmented users from the batch for the 'k' number of sessions of the first predefined category, wherein the Buy/Quit Ratio (BQR) is a measure of instances of buying an item versus instances of quitting without buying any item by a segmented user in 'k' sessions, wherein 'k' is a positive integer.

13. The system of claim 12, wherein the processor is further configured to compare the BQRs of each instance of the 'k' sessions of the predetermined number of segmented users applied with the first technique and the remaining number of segmented users applied with the second technique to check whether the BQRs for the segmented users are continuously high, or continuously low, or remain unchanged as a trend throughout the 'k' sessions.

14. The system of claim 13, wherein the processor is further configured to update the BM model if the BQRs for the segmented users are continuously high.

15. The system of claim 12, wherein the processor is further configured to re-segment the user if the BQRs for the segmented users are continuously low or remain unchanged.

16. The system of claim 9, wherein the validation of the implemented persuasion technique is repeated until the persuasion technique for corresponding segmented users is accurately identified.

17. A computer program product for implementing persuasion techniques based on persona of multiple users, the computer program product comprising:

a non-transitory computer readable medium having computer readable program code comprising program instructions that when executed by a microprocessor, cause the microprocessor to:

extract session data for each event that corresponds to a predefined online activity, separately for each of the multiple users, wherein the session data is extracted based on at least in part intercepting a request and a corresponding response from an application associated with the predefined online activity;

analyze the session data using a behavior mapping model for identifying personality traits of each of the multiple users associated with the predefined online activity, wherein the behavior mapping model includes one or more pre-defined categories of the multiple users, each category is based on one or more attributes that are predefined by analyzing personality traits associated with the multiple users related to e-commerce trends;

segment the multiple users based on the identified personality traits to generate user segmentation data, wherein the segmentation is performed at least through an iterative process of re-segmenting the multiple users into the pre-defined categories until the true persona of the user is identified, and further updating the one or more attributes of the behaviour mapping model based on the resegmentation;

generate and implement one or more persuasion techniques corresponding to the user segmentation data comprising computing a Buy/Quit (BQR) ratio for the segmented users for 'k' number of sessions based on a first technique and a second technique applied to a batch of the segmented users of a first predefined category, wherein if the Buy/Quit (BQR) ratio of the second technique is found to be greater than the first technique, the users with the applied second technique are re-segmented to a second predefined category; and validate accuracy of the implemented persuasion technique for each user of the multiple users.

18. The computer program product of claim 17, wherein the one or more categories of the multiple users include decisive, visitor, learned and explorer.

19. The computer program product of claim 17, wherein the one or more attributes include average duration per session, number of items in the cart, average number of clicks per session, count of users proceeding to final checkout, and count of users leaving the e-commerce application without buying.

20. The computer program product of claim 17, wherein the program instructions further cause the processor to apply a first technique to a predetermined number of segmented users selected from the batch of segmented users for the 'k' number of sessions of the first predefined category and the second technique is applied to the remaining number of segmented users from the batch for the 'k' number of sessions of the first category, wherein the Buy/Quit Ratio (BQR) is a measure of instances of buying an item versus instances of quitting without buying any item by a segmented user in 'k' sessions, wherein 'k' is a positive integer.

21. The computer program product of claim 20, wherein the program instructions further cause the processor to compare the BQRs of each instance of the 'k' sessions of the predetermined number of segmented users applied with the first technique and the remaining number of segmented users applied with the second technique to check whether the BQRs for the segmented user are continuously high, or continuously low, or remain unchanged as a trend throughout the 'k' sessions.

22. The computer program product of claim 21, wherein the program instructions further cause the processor to update the BM model if the BQRs for the segmented users are continuously high.

23. The computer program product of claim 21, wherein the program instructions further cause the processor to re-segment the user if the BQRs for the segmented users are continuously low or remain unchanged.

24. The computer program product of claim 17, wherein the program instructions further cause the processor to repeat the validation step until the persuasion technique for corresponding segmented users is accurately identified.

\* \* \* \* \*